United States Patent [19]

Mair

[11] Patent Number: 4,764,429
[45] Date of Patent: Aug. 16, 1988

[54] FINELY, DIVIDED, SPHERICAL, TWO-LAYER SOLID PARTICLES

[75] Inventor: Gunther Mair, Mannheim, Fed. Rep. of Germany

[73] Assignee: BASF Aktiengesellschaft, Ludwigshafen, Fed. Rep. of Germany

[21] Appl. No.: 103,207

[22] Filed: Sep. 30, 1987

[30] Foreign Application Priority Data

Sep. 30, 1986 [DE] Fed. Rep. of Germany ....... 3633130

[51] Int. Cl.⁴ .............................................. C01G 49/06
[52] U.S. Cl. ................... 428/403; 252/62.62
[58] Field of Search ...................... 428/403; 252/62.62

[56] References Cited

U.S. PATENT DOCUMENTS

| | | | |
|---|---|---|---|
| 3,770,500 | 11/1973 | Imaoka et al. | 428/403 |
| 3,822,210 | 7/1974 | Iwase et al. | 252/62.64 |
| 4,097,392 | 6/1978 | Goldman et al. | 252/62.62 |
| 4,259,368 | 3/1981 | Rudolf et al. | 252/62.62 |
| 4,390,361 | 6/1983 | Sueyoshi et al. | 428/403 |

FOREIGN PATENT DOCUMENTS

| | | | |
|---|---|---|---|
| 49-124599 | 11/1974 | Japan | 252/62.62 |
| 50-78599 | 6/1975 | Japan | 252/62.62 |
| 50-78893 | 6/1975 | Japan | 252/62.62 |

*Primary Examiner*—Jack Cooper
*Attorney, Agent, or Firm*—Keil & Weinkauf

[57] ABSTRACT

Finely divided, spherical, two-layer solid particles having a diameter of from 5 to 100 nm and consisting of
(A) from 60 to 70% by weight of a core of spherical, rhombohedral $\alpha$-$Fe_2O_3$ having a purity greater than 98% and
(B) from 30 to 40% by weight of a shell of a basic metal hydroxide sulfate which has an alkali metal ion content of less than 500 ppm and is of the general formula $$M_v Mn_w Zn_x (OH)_y (SO_4)_z$$

where M is Mg, Co, Ni, Cd, divalent Fe and/or divalent Cu, v is from 0 to 0.8, w is from 0.1 to 0.9, x is from 0.1 to 0.9, y is from 1.01 to 1.99, z is from 0.005 to 0.505, v++x 1 and 0.5 y+z=1, and a process for the production of finely divided, magnetic, cubic or hexagonal ferrite particles.

1 Claim, No Drawings

FINELY, DIVIDED, SPHERICAL, TWO-LAYER SOLID PARTICLES

The present invention relates to novel finely divided, spherical, two-layer solid particles $F_1$ having a diameter of from 5 to 100 nm and consisting of (A) from 60 to 70% by weight of a core of spherical, rhombohedral $\alpha$-$Fe_2O_3$ having a purity greater than 98% and (B) from 30 to 40% by weight of a shell of a basic metal hydroxide sulfate which has an alkali metal ion content of less than 500 ppm and is of the general formula I $$M_v Mn_w Zn_x (OH)_y (SO_4)_z \qquad I$$

where M is Mg, Co, Ni, Cd, divalent Fe and/or divalent Cu, v is from 0 to 0.8, w is from 0.1 to 0.9, x is from 0.1 to 0.9, y is from 1.01 to 1.99, z is from 0.005 to 0.505, $v+w+x=1$ and $0.5\,y+z=1$.

The present invention furthermore relates to an improved process for the production of finely divided, magnetic, cubic or hexagonal ferrite particles $F_1'$ or $F_2'$, in which finely divided, two-layer solid particles $F_1$ or $F_2$ consisting of an iron oxide or iron oxide hydroxide core (A) and a metal hydroxide-containing shell (B) are formed as intermediates.

Solid particles are referred to as spherical when they are round, almost round, cuboidal or octahedral; they are referred to as acicular when their ratio of length to thickness is greater than 6:1. Finely divided solid particles are particles having a maximum diameter of from 5 to 2000 nm. Assuming that the solid particles are monodisperse and substantially pore-free, this diameter roughly corresponds to an inner surface area determined according to Brunauer, Emmet and Teller (BET surface area) of from 0.2 to 30 m$^2$/g.

Magnetic substances which become highly magnetic as a result of an externally applied magnetic field and have a small residual magnetization or remanence in the absence of an external magnetic field are referred to as magnetically soft, whereas those having a high remanence are referred to as magnetically hard.

Ferrites are ceramic iron oxide compounds. Cubic ferrites have the approximate composition $MFe_2O_4$ (where M is a divalent metal ion), possess a spinel structure and predominantly tend to form spherical particles. The composition of hexagonal ferrites cannot be expressed in a simple manner since their stoichiometry and crystal structure vary greatly. Hexagonal ferrites predominantly tend to form anisotropic particles, such as platelets or needles.

Magnetically hard recording media are the known audio tapes, video tapes, storage disks, floppy disks and magnetic stripes on, for example, check cards or credit cards, based on iron oxide.

Plastics which contain large amounts of finely divided, magnetic particles as fillers are referred to as plastoferrite materials.

Finely divided, acicular, two-layer solid particles $F_2$ which consist of an acicular core (A) of iron oxide or iron oxide hydroxide and a shell (B) containing manganese hydroxide and zinc hydroxide are disclosed in German Laid-Open Application DOS No. 2,916,403. They are, however, unsuitable for the production of shaped articles from magnetically soft ferrites, such as cores or transformer cores.

It is known that such acicular solid particles $F_2$ are produced by precipitating metal hydroxides from their aqueous salt solutions by means of an aqueous base onto the surface of finely divided, acicular iron oxide or iron oxide hydroxide particles dispersed in water, after which the resulting two-layer particles $F_2$ are isolated, washed with water and then dried. Thereafter, the particles $F_2$ are sintered at from 800° to 1100° C., which is generally referred to as green firing. This gives finely divided, acicular, magnetically hard hexagonal ferrite particles $F_2$ which can be used for the production of magnetically hard recording media and of plastoferrite materials. The disadvantage here is that, when the particles $F_2$ are washed with water, the composition of their shell (B) alters in an undesirable manner, which substantially impairs the reproducibility of the process and may considerably reduce the quality of the ferrite particles $F_2$, so that they are no longer suitable for the above-mentioned purposes.

Finely divided, spherical, magnetic, cubic manganese zinc ferrite particles $F_1''$ are usually produced by simultaneous precipitation of the hydroxides from metal salt solutions having appropriate compositions, by means of aqueous bases, such as ammonia, sodium hydroxide solution and/or sodium carbonate (cf. U.S. Pat. Nos. 4,097,392 and 3,822,210). The resulting single-layer, finely divided solid particles containing metal hydroxides (hydroxide particles) are filtered off, washed with water, dried, and sintered at from 500° to 800° C. Particle growth results in the formation of the desired finely divided, spherical, magnetically soft, cubic ferrite particles $F_141$. These are granulated and screened in order to obtain a very narrow particle size distribution. Thereafter, additives, such as organic binders, are added, and the resulting mixture is converted, under high pressure, to the green compact of the shaped article to be produced. This green compact is then fired at from 1000° to 1200° C. to give the shaped article, for example a core (cf. U.S. Pat. No. 4,097,392). The disadvantage here is that the hydroxide particles are difficult to filter off, and washing with water frequently results in an undesirable change in the particle composition, which substantially impairs the reproducibility of the process and considerably reduces the quality of the ceramic shaped articles.

It is an object of the present invention to provide finely divided, spherical, two-layer solid particles $F_1$ which are particularly suitable for the production of finely divided, spherical, magnetically soft, cubic ferrite particles $F_1'$.

It is a further object of the invention to provide a novel improved process for the production of finely divided, magnetic, cubic or hexagonal ferrite particles $F_1'$ or $F_2'$, in which finely divided, two-layer solid particles $F_1$ or $F_2$ consisting of an iron oxide or iron oxide hydroxide core (A) and a metal hydroxide-containing shell (B) are formed as intermediates, and which gives ferrite particles $F_1'$ or $F_2'$ which, with regard to their narrow particle size distribution, their purity, their magnetic properties and their processing properties, are superior to the prior art, so that they are particularly suitable for the production of magnetically soft, ceramic shaped articles or of magnetically hard recording media and of plastoferrite materials.

We have found that this object is achieved by the solid particles $F_1$ defined at the outset.

We have furthermore found a process for the production of finely divided, magnetic, cubic or hexagonal ferrite particles $F_1'$ or $F_2'$ by (a) precipitating metal hydroxides from their aqueous salt solutions by means of an aqueous base onto the surface of finely divided iron oxide or iron oxide hydroxide particles dispersed in water, with the formation of finely divided, two-layer solid particles $F_1$ or $F_2$ consisting of a core (A) and a shell (B) and (b) isolating, washing, drying and sintering (green firing) the two-layer solid particles $F_1$ or $F_2$, wherein from 5 to 20% by volume, based on the volume of the dispersion, of a $C_1$–$C_6$-alcohol are added to the aqueous dispersion of the particles $F_1$ or $F_2$ before the latter are isolated, after which the particles are isolated and then washed several times with a mixture of from 0.05 to 0.3 part by volume of a $C_1$–$C_6$-alcohol and 1 part by volume of water.

The novel particles $F_1$ have a diameter of from 5 to 100 advantageously from 8 to 90, in particular from 10 to 80, nm. They consist of a core (A) and a shell (B) which surrounds this core (A).

The proportion of the cores (A) in the particles $F_1$ is from 60 to 70, preferably from 62 to 68, in particular from 64 to 66%, by weight. The cores (A) consist of spherical rhombohedral $\alpha$-$Fe_2O_3$ having a purity greater than 98%, preferably 99%, in particular 99.4%. According to the invention, carbonyl iron oxide which is prepared from iron pentacarbonyl and has a purity greater than 99.4%, in particular greater than 99.5% or higher, is particularly advantageous here. $\alpha$-$Fe_2O_3$ particles which are suitable according to the invention have a diameter of from 10 to 80 nm and a BET surface area of from 10 to 25 $m^2/g$.

The proportion of the shells (B) in the particles $F_1$ is from 30 to 70, preferably from 32 to 38, in particular from 34 to 36%, by weight. The shells contain less than 500 ppm of alkali metal ions and consist of basic metal hydroxide sulfates. The term basic indicates that, in the shells, the number of equivalents of hydroxyl anions is always greater than the number of equivalents of sulfate anions, the number of equivalents being the number of negative charges required to electrically neutralize the cations.

Examples of shells (B) which are suitable according to the invention and are of the general formula I, where $v \neq 0$, are:

$Mg_{0.1}Mn_{0.6}Zn_{0.3}(OH)_{1.4}(SO_4)_{0.3}$,
$Ni_{0.3}Mn_{0.2}Zn_{0.5}(OH)_{1.8}(SO_4)_{0.1}$,
$Cd_{0.05}Mn_{0.65}Zn_{0.3}(OH)_{1.08}(SO_4)_{0.46}$,
divalent $Fe_{0.8}Mn_{0.1}Zn_{0.1}(OH)_{1.9}(SO_4)_{0.05}$,
divalent $Cu_{0.02}Mn_{0.7}Zn_{0.28}(OH)_{1.4}(SO_4)_{0.3}$,
$Mg_{0.2}Co_{0.1}Mn_{0.6}Zn_{0.1}(OH)_{1.7}(SO_4)_{0.15}$,
$Co_{0.1}Ni_{0.15}Mn_{0.5}Zn_{0.25}(OH)_{1.3}(SO_4)_{0.35}$,
divalent $Fe_{0.7}$ divalent $Cu_{0.02}Mn_{0.14}Zn_{0.14}(OH)_{1.8}(SO_4)_{0.1}$,
$Mg_{0.01}Co_{0.01}Ni_{0.01}Mn_{0.67}Zn_{0.3}(OH)_{1.3}(SO_4)_{0.35}$ and
$Co_{0.01}Ni_{0.01}Cd_{0.01}Mn_{0.7}Zn_{0.27}(OH)_{1.85}(SO_4)_{0.075}$.

Examples of shells (B) which are suitable according to the invention and of the general formula I, where $v = 0$, are:

$Mn_{0.7}Zn_{0.3}(OH)_{1.02}(SO_4)_{0.49}$,
$Mn_{0.1}Zn_{0.9}(OH)_{1.98}(SO_4)_{0.01}$,
$Mn_{0.9}Zn_{0.1}(OH)_{1.5}(SO_4)_{0.25}$ and
$Mn_{0.5}Zn_{0.5}(OH)_{1.6}(SO_4)_{0.2}$.

For shells (B) which are particularly suitable according to the invention and of the general formula I, $v = 0$, $w$ = from 0.6 to 0.8, $x$ = from 0.2 to 0.4, $y$ = from 1.4 to 1.9 and $z$ = from 0.05 to 0.3. Examples of such shells (B) are:

$Mn_{0.6}Zn_{0.4}(OH)_{1.4}(SO_4)_{0.3}$,
$Mn_{0.7}Zn_{0.3}(OH)_{1.9}(SO_4)_{0.05}$,
$Mn_{0.65}Zn_{0.35}(OH)_{1.5}(SO_4)_{0.25}$,
$Mn_{0.72}Zn_{0.28}(OH)_{1.76}(SO_4)_{0.12}$ and
$Mn_{0.72}Zn_{0.28}(OH)_{1.64}(SO_4)_{0.18}$.

Particularly advantageous novel particles $F_1$ have a diameter of from 10 to 80 nm and a BET surface area of from 15 to 22 $m^2/g$. Their cores (A) consist of carbonyl iron oxide having a purity of 99.5% or higher. The proportion of cores (A) in the particles $F_1$ is from 64 to 66% by weight. Their shells (B) contain less than 500 ppm of alkali metal ions. They consist of manganese zinc hydroxide sulfate having the particularly suitable composition stated above. Very particularly advantageous novel particles $F_1$ have a sulfate content of from 4 to 6% by weight, based on their total weight; this corresponds to the conditions $y$ = from 1.64 to 1.76 and $z$ = from 0.12 to 0.18 in formula I.

The novel particles $F_1$ can be prepared by the prior art processes. Particularly suitable for this purpose is the process in which the desired amount of finely divided $\alpha$-$Fe_2O_3$ particles (BET surface area: 10–20 $m^2/g$) is dispersed in water, and the appropriate salt mixtures having the desired composition are dissolved in the dispersion. All salts which are water-soluble, such as the chlorides, bromides, nitrates, sulfates or acetates, are suitable, the sulfates being preferred.

An aqueous base is then added to this aqueous mixture in an amount such that a pH of from 9 to 11 is obtained. Sodium hydroxide solution or potassium hydroxide solution is suitable, the former being preferred. In general, the mixture is stirred for a relatively long time, the pH being kept constant at 9–11, in particular 10.

The resulting dispersion of the particles F1 is then generally filtered, after which the particles are washed with water and dried.

Where divalent iron is used, it is advisable to carry out the process steps under an inert gas.

According to the invention, it is very particularly advantageous if the particles $F_1$ are prepared and isolated in the novel process for the production of ferrite particles $F_1'$ or $F_2'$.

However, the novel process is not restricted merely to the production of particles F1 but can also very successfully be used for the synthesis of the particles $F_2$ which are not according to the invention. Furthermore, it may be employed for the production of ferrite particles $F_1'$ or $F_2'$.

From the point of view of process engineering, the novel process has no special features, i.e. in principle no specially developed and adapted apparatuses are required to carry out the process, and each individual process step is based on a conventional chemical method.

The novel process starts from an aqueous dispersion of finely divided iron oxide or iron oxide hydroxide particles, the amount of these particles depending on the desired stoichiometric composition of the end products. Examples of suitable finely divided iron oxide or iron oxide hydroxide particles are finely divided particles of acicular $\gamma$-$Fe_2O_3$ or $\alpha$-$FeO(OH)$ (Goethite) or of spherical $\alpha$-$Fe_2O_3$.

The appropriate metal salts are dissolved in the dispersion. The type and amount of each of the metal salts depend on the desired stoichiometric composition of the end product.

Examples of suitable salts are those mentioned above, of which the sulfates are preferred.

A 5-10 N alkali metal hydroxide solution is added to this mixture at room temperature while stirring, until a pH of from 9 to 11 is obtained. The duration of the addition is chosen so that a mechanically and chemically stable shell (B) can form on the core (A). In general, this duration is from 10 minutes to 2 hours, depending on the size of the batch.

The dispersion of the particles $F_1$ or $F_2$ is then stirred at room temperature for a further 10 minutes to 1 hour, and, if necessary, further alkali metal hydroxide solution is added in order to keep the pH of the dispersion at 9-11, in particular 10.

In the procedure according to the invention, from 5 to 20% by volume, based on the volume of the dispersion, of a $C_1$-$C_6$-alcohol are then added to this dispersion, while stirring.

Examples of suitable alcohols are ethanol, n-propanol, isopropanol, n-butanol, isobutanol, tert-butanol, n-pentanol, n-hexanol and cyclohexanol as well as mixtures of these, isopropanol being advantageous.

After the particles $F_1$ or $F_2$ have been isolated, they are washed several times with a mixture of 1 part by volume of water and from 0.05 to 0.3 part by volume of the abovementioned alcohols, by the procedure according to the invention. Washing is continued until the water/alcohol mixture gives a neutral reaction and anions and/or cations are no longer detectable therein, i.e. conventional detection reactions for the relevant ions are negative.

The particles are then dried.

These process steps can, if necessary, be carried out under an inert gas.

The particles thus obtained are either the novel solid particles $F_1$ or solid particles $F_2$ which are known per se.

In the further course of the process, the particles $F_1$ are converted by sintering, i.e. by green firing, at from 800° to 1100° C. into ferrite particles $F_1'$ having a composition which is known per se. The sintering time is in general from 30 minutes to 2 hours. During sintering, the number of particles decreases and the particle diameter increases to 100-2000 nm, depending on the sintering time and sintering temperature. The sulfate content decreases dramatically and reaches values of less than 0.01% by weight. The atomic ratio of the metals present in the ferrite particles $F_1'$ corresponds to that of the starting compounds. Where deviations from this occur, they are no greater than ±3%. The alkali metal ion content of the ferrite particles $F_1'$ is less than 500 ppm.

In the further course of the process, the conventional solid particles $F_2$ are converted by sintering at from 800° to 1100° C. into ferrite particles $F_2'$ having a composition which is known per se. The sintering time is in general from 30 minutes to 2 hours. The sintering results in only a slight change in the particle size. The sulfate content decreases dramatically and reaches values of less than 0.01% by weight. The atomic ratio of the metals present in the ferrite particles $F_2$ corresponds to that of the starting compounds. Where deviations from this occur, they are no greater than ±3%. The alkali metal ion content of the ferrite particles $F_2'$ is less than 500 ppm.

The ferrite particles $F_1'$ produced by the novel process can be converted to magnetically soft, ceramic shaped articles in a conventional manner.

The ferrite particles $F_2'$ produced by the novel process can be used for the production of magnetically hard recording media and of plastoferrite materials.

The novel solid particles $F_1$ have a large number of special advantages over the prior art. For example, they are particularly pure and for this reason alone are very suitable for the production of magnetically soft ferrites $F_1'$ and magnetically soft, ceramic shaped articles. They can be produced in an exactly reproducible manner and with a very narrow particle size distribution. Their shells are mechanically and chemically very stable, so that the particles suffer no damage during further handling and/or during storage.

The novel process also has particular advantages over the prior art. For example, this process can be used to produce finely divided, magnetic, cubic or hexagonal ferrite particles $F_1'$ or $F_2'$ in an exactly reproducible manner and in high purity, the particularly low alkali metal ion content being especially noteworthy. This particularly low alkali metal ion content is obtained without having to accept an undesirable change in the particle composition. The cubic or hexagonal ferrite particles $F_1'$ or $F_2'$ produced by the novel process therefore give particularly advantageous magnetically soft shaped articles or magnetically hard recording media and plastoferrite materials.

The novel process has very particular advantages over the prior art when the said process is used for the production of the novel solid particles $F_1$ and for further processing these particles to give ferrite particles $F_1'$. This gives ferrite particles $F_1'$ whose composition, low alkali metal ion content and narrow particle size distribution are exactly reproducible. Moreover, the ferrite particles $F_1'$ suffer no damage either during transport or during prolonged storage and further processing. In addition, the sintering can be carried out at a comparatively low temperature in a comparatively short time.

EXAMPLES

In the Examples and Comparative Experiments, the particle composition was determined from the increase in weight of the dispersed iron oxide or iron oxide hydroxide particles and chemical elemental analysis. The diameter of the particles was measured with the aid of the transmission electron microscope. The inner surface area of the particles was determined by the BET method.

EXAMPLE 1

Production of solid particles $F_1$ and of ferrite particles $F_1'$ by the novel process A mixture calculated to give a metal atom ratio in the ferrite of 2.6 Mn:1Zn:8.4Fe ($\hat{=}Mn_{0.65}Zn_{0.25}Fe_{2.1}O_4$) and consisting of 143.7 g of $\alpha$-$Fe_2O_3$ (red carbonyl iron oxide, purity 99.5%; BET surface area 10-20 m$^2$/g; diameter of the spherical particles 8-70 nm), 94.2 g of $MnSO_4.H_2O$, 61.6 g of $ZnSO_4.7H_2O$ and 1200 ml of water was initially taken under an inert gas.

160 ml of 8 N sodium hydroxide solution were added to this mixture in the course of 15 minutes at room temperature and while stirring, until a pH of 10 was obtained. The reaction mixture was stirred for a further 15 minutes at room temperature, the pH being kept constant at 10 by adding further 8 N sodium hydroxide solution.

120 ml of isopropanol were added to the resulting dispersion of the solid particles F1. Thereafter, the particles were filtered off and washed with eight times 1 liter of a mixture of water and isopropanol (volume ratio 10:1) and then dried and divided into portions.

One portion of the resulting solid particles $F_1$ was analyzed, and another was sintered for 60 minutes at 1000° C. and then investigated.

The results of the chemical analysis and the determination of the BET surface area and of the particle diameter are shown in the Table.

The results show that the required ferrite composition can very readily be obtained with the aid of the novel process, a very low sodium ion content being achieved without a loss of manganese and/or zinc having to be accepted; this is a fundamental advantage for the further processing of the particles $F_1$ and of the ferrite particles $F_1'$ produced from them. Moreover, the ferrite particles $F_1'$ had a narrow particle size distribution and a particularly low remanence and were spherical in shape. They were very suitable for the production of magnetically soft, ceramic shaped articles.

EXAMPLES 2 AND 3

Preparation of solid particles $F_1$ and ferrite particles $F_1'$ by the novel process Preparation method Example 1 was repeated twice, except that in Example 2, the salts and $\alpha$-Fe$_2$O$_3$ were initially taken in 800 ml instead of 1200 ml of water, and the solid particles $F_1$ were washed with ten times 1 liter of a 10:1 water-/isopropanol mixture, and in Example 3, 300 ml instead of 120 ml of isopropanol were added to the suspension of the solid particles $F_1$, and the solid particles I were washed with six times 1 liter of a 4:1 water/isopropanol mixture.

The results of the chemical analysis and the determination of the BET surface area and of the particle diameter are shown in the Table.

The results show that the desired ferrite composition can be excellently reproduced using the novel process, the particular advantages stated in Example 1 always being obtained.

EXAMPLES 4 AND 5

Preparation of solid particles $F_2$ and of ferrite particles $F_2'$ by the novel process Preparation method Example 1 was repeated twice, except that acicular $\alpha$-FeO(OH) having a BET surface area of 27 m$^2$/g and a ratio of particle length to particle thickness of 10 was used.

The results of the chemical analysis and the determination of the BET surface area and of the particle diameter are shown in the Table.

The results show that the desired ferrite composition can be obtained and reproduced in an excellent manner using the novel process, a particularly low sodium ion content also being obtained without a loss of manganese and/or zinc having to be accepted; this is a fundamental advantage. Moreover, the ferrite particles $F_2'$ have a uniform, well pronounced acicular shape. They are very useful for the production of magnetically hard recording media and of plastoferrite materials.

EXAMPLE 6

Preparation of solid particles $F_1$ and of ferrite particles $F_1'$ by a conventional process Preparation method Example 1 was repeated, except that the solid particles $F_1$ were washed with four times 1 liter of water.

The results of the chemical analysis and the determination of the BET surface area and of the particle diameter are shown in the Table.

The results show that the composition of the solid particles $F_1$ produced by the conventional process differed somewhat from the desired composition, although an advantageously low sodium ion content was obtained, which was accompanied by a certain loss of manganese and zinc. The particles $F_1$ were spherical in shape. The composition of the ferrite particles $F_1'$ produced from these particles likewise differed slightly from the desired composition. The BET surface area of the ferrite particles $F_1'$ was comparatively high and its particle size distribution was broad. The particles were predominantly spherical in shape. They were suitable for the production of magnetically soft, ceramic shaped articles.

COMPARATIVE EXPERIMENT 1

Production of ferrite particles $F_1''$ by a conventional process

Preparation method

A mixture calculated to correspond to an empirical formula Mn$_{0.65}$Zn$_{0.25}$Fe$_{2.1}$O$_4$ and consisting of 486.5 g of FeCl$_3$.6H$_2$O, 110.3 g of MnCl$_2$.4H$_2$O, 29.2 g of ZnCl$_2$ and 1200 ml of H$_2$O was initially taken in air.

872 ml of 8 N sodium hydroxide solution were added to this solution in the course of 20 minutes while stirring, so that a pH of 10 was obtained. The reaction mixture was stirred for a further 15 minutes at room temperature, the pH being kept constant at 10 by adding further 8 N sodium hydroxide solution, and oxygen being passed through the reaction mixture. The resulting dispersion of finely divided mixed manganese zinc iron hydroxides (hydroxide particles) was filtered, the filtration being difficult because particularly finely divided particles either passed through the filter or, when a fine-pore filter was used, blocked the latter.

The hydroxide particles filtered off were washed with ten times 1 liter of water and then dried and divided into portions.

One of the portions was analyzed and the other was sintered for 60 minutes at 1000° C., after which the resulting ferrite particles $F_1''$ were investigated.

The results of the chemical analysis and the determination of the BET surface area and of the particle diameter are shown in the Table.

The results show that the hydroxide particles had a disadvantageously high sodium ion content and their composition differed substantially from the desired composition. Their particle size distribution was broad. Some of the particles had a poorly defined acicular shape while another, major proportion had an irregular shape. Well defined, spherical particles were in the minority. Furthermore, the ferrite particles $F_1''$ did not have the desired composition and shape. Their sodium content was disadvantageously high. They were suitable only to a limited extent for the production of magnetically soft, ceramic shaped articles.

COMPARATIVE EXPERIMENTS 2 AND 3

Production of solid particles $F_2$ and of ferrite particles $F_2'$ by a conventional process

Preparation method

Examples 4 and 5 were repeated, except that the solid particles $F_2$ were always washed with four times 1 liter of water in this case.

The results of the chemical analysis and the determination of the BET surface area and of the particle diameter are shown in the Table.

The results show that the known process was inferior to the novel process with regard to the exactness with which compositions of solid particles and of ferrites could be obtained and reproduced. Furthermore, the acicular shape of the particles $F_2'$ was not so well defined as in the case of those produced by the procedure according to the invention, which was a disadvantage when they were used for the production of magnetically hard recording media and plastoferrite materials.

TABLE

Experimental Results - desired composition of the ferrite particles
$F_1'$, $F_2'$ or $F_1''$: $Mn_{0.65}Zn_{0.25}Fe_{2.1}O_4$; metal atom ratio: 2.6 Mn:1 Zn:8.4 Fe

| Examples and Comparative Experiments No. | BET surface area ($m^2/g$) | Particle diameter (nm) | $Na^{\oplus}$ content (in the shell (B) of the solid particles or in the ferrite particles) (ppm) | $SO_4^{2\ominus}$ content (in the shell (B) of the solid particles or in the ferrite particles) (% by weight) | Composition: empirical formula and metal atom ratio |
|---|---|---|---|---|---|
| Example 1 | | | | | |
| Particles $F_1$ | 20 | 10–80 | Shell (B): 90 | Shell (B): 4 | Shell (B): $Mn_{0.72}Zn_{0.28}(OH)_{1.76}(SO_4)_{0.12}$ 2.57 Mn:1 Zn:8.13 Fe |
| Ferrite particles $F_1'$ | 0.2 | 500–2,000 | 30 | 0.005 | $Mn_{0.659}Zn_{0.256}Fe_{2.08}O_4$ 2.57 Mn:1 Zn:8.13 Fe |
| Example 2 | | | | | |
| Particles $F_1$ | 21 | 15–80 | Shell (B): 90 | Shell (B): 6 | Shell (B): $Mn_{0.72}Zn_{0.28}(OH)_{1.64}(SO_4)_{0.18}$ 2.6 Mn:1 Zn:8.36 Fe |
| Ferrite particles $F_1'$ | 0.25 | 1,000–2,000 | 30 | 0.001 | $Mn_{0.65}Zn_{0.25}Fe_{2.1}O_4$ 2.6 Mn:1 Zn:8.4 Fe |
| Example 3 | | | | | |
| Particles $F_1$ | 19 | 8–90 | Shell (B): 340 | Shell (B): 5 | Shell (B): $Mn_{0.73}Zn_{0.27}(OH)_{1.7}(SO_4)_{0.15}$ 2.67 Mn:1 Zn:8.36 Fe |
| Ferrite particles $F_1'$ | 0.2 | 10–80 | 120 | 0.005 | $Mn_{0.67}Zn_{0.25}Fe_{2.08}O_4$ 2.68 Mn:1 Zn:8.32 Fe |
| Example 4 | | | | | |
| Particles $F_2$ | 29 | 300–500 (= length) | Shell (B): 100 | Shell (B): 7 | Shell (B): $Mn_{0.72}Zn_{0.28}(OH)_{1.56}(SO_4)_{0.22}$ 2.6 Mn:1 Zn:8.35 Fe |
| Ferrite particles $F_2$ | 7 | 500–1,100 (= length) | 35 | 0.001 | $Mn_{0.65}Zn_{0.25}Fe_{2.1}O_4$ 2.6 Mn:1 Zn:8.4 Fe |
| Example 5 | | | | | |
| Particles $F_2$ | 28 | 250–500 (= length) | Shell (B): 90 | Shell (B): 5 | Shell (B): $Mn_{0.72}Zn_{0.28}(OH)_{1.7}(SO_4)_{0.15}$ 2.58 Mn:1 Zn:8.34 Fe |
| Ferrite particles | 8.5 | 450–1,000 (= length) | 30 | 0.004 | $Mn_{0.65}Zn_{0.25}Fe_{2.1}O_4$ 2.58 Mn:1 Zn:8.4 Fe |
| Example 6 | | | | | |
| Particles $F_1$ | 22 | 10–80 | Shell (B): 100 | Shell (B): 6 | Shell (B): $Mn_{0.71}Zn_{0.29}(OH)_{1.6}(SO_4)_{0.2}$ 2.5 Mn:1 Zn:8.8 Fe |
| Ferrite particles $F_1'$ | 0.1 | 1,000–2,000 | 35 | 0.001 | $Mn_{0.62}Zn_{0.24}Fe_{2.14}O_4$ 2.58 Mn:1 Zn:8.9 Fe |
| Comparison 1 | | | | | |
| Hydroxide particles | 25 | 5–90 | 68,000 | — | 2.5 Mn:1 Zn:8.5 Fe |
| Ferrite particles $F_1''$ | 0.05 | 1,500–3,000 | 68,000 | — | $Mn_{0.66}Zn_{0.26}Fe_{2.08}O_4$ 2.5 Mn:1 Zn:8.0 Fe |
| Comparison 2 | | | | | |
| Particles $F_2$ | 25 | 400–1,000 (= length) | Shell (B): 200 | Shell (B): 5 | Shell (B): $Mn_{0.74}Zn_{0.26}(OH)_{1.7}(SO_4)_{0.15}$ 3 Mn:1 Zn:11.3 Fe |
| Ferrite particles $F_2'$ | 7 | 500–1,300 (= length) | 70 | 0.001 | $Mn_{0.58}Zn_{0.2}Fe_{2.22}O_4$ 2.9 Mn:1 Zn:11.1 Fe |
| Comparison 3 | | | | | |
| Particles $F_2$ | 28 | 300–900 (= length) | Shell (B): 110 | Shell (B): 4 | Shell (B): $Mn_{0.77}Zn_{0.23}(OH)_{1.76}(SO_4)_{0.12}$ 3.3 Mn:1 Zn:12.3 Fe |
| Ferrite particles $F_2'$ | 7.2 | 500–1,200 (= length) | 40 | 0.003 | $Mn_{0.6}Zn_{0.18}Fe_{2.22}O_4$ 3.3 Mn:1 Zn:12.3 Fe |

I claim:

1. Finely divided, spherical, two-layer solid particles $F_1$ having a diameter of from 5 to 100 nm and consisting of (A) from 60 to 70% by weight of a core of spherical, rhombohederal $\alpha\text{-}Fe_2O_3$ having a purity greater than 98% and (B) from 30 to 40% by weight of a shell of a basic metal hydroxide sulfate which has an alkali metal ion content of less than 500 ppm and is of the formula I $$M_v Mn_w Zn_x (OH)_y (SO_4)_z \quad \text{I}$$

wherein M is Mg, Co, Ni, Cd, divalent Fe and/or divalent Cu, v is from 0 to 0.8, w is from 0.1 to 0.9, x is from 0.1 to 0.9, y is from 1.01 to 1.99, z is from 0.005 to 0.505, v+w+x=1 and 0.5 y+z=1.

* * * * *